Figure 1:
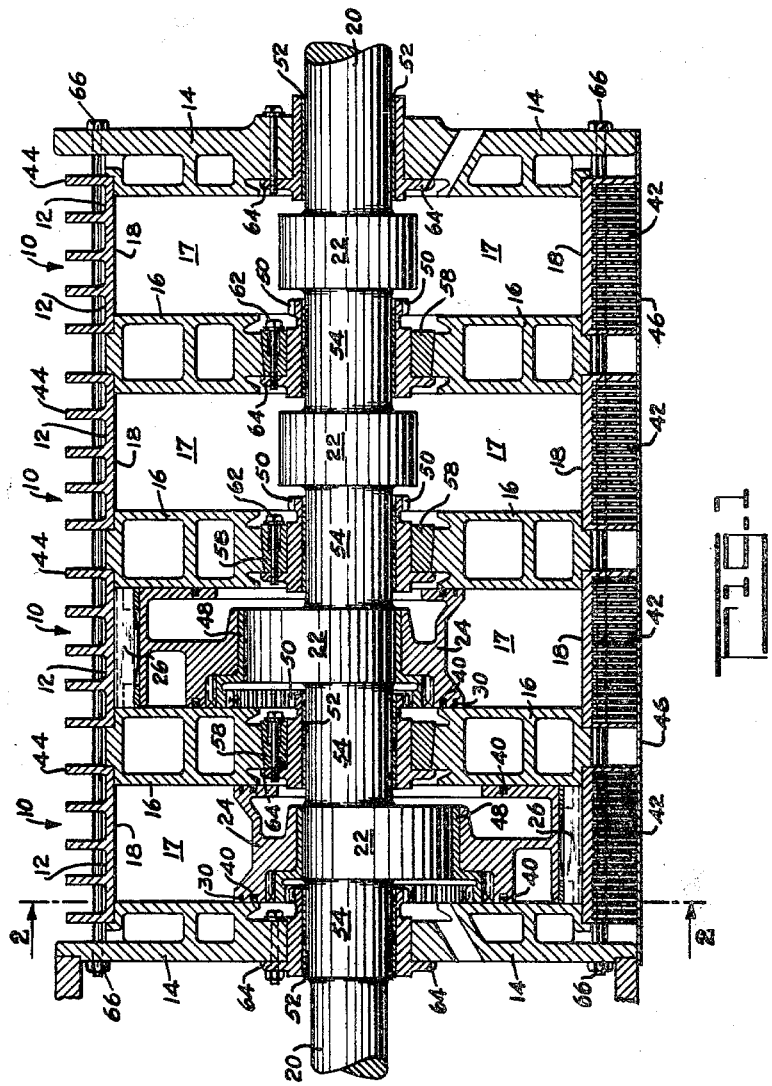

July 6, 1965    C. JONES ET AL    3,193,187
MULTI-UNIT ROTARY MECHANISM
Filed Dec. 31, 1962    5 Sheets-Sheet 1

INVENTORS
CHARLES JONES
GEORGE BONNER
ALEXANDER H. RAYE
BY
ATTORNEY

INVENTORS
CHARLES JONES
GEORGE BONNER
ALEXANDER H. RAYE

BY *Julian Falk*

ATTORNEY

July 6, 1965   C. JONES ETAL   3,193,187
MULTI-UNIT ROTARY MECHANISM
Filed Dec. 31, 1962   5 Sheets-Sheet 4

INVENTORS
CHARLES JONES
GEORGE BONNER
ALEXANDER H. RAYE
BY Julian Falk
ATTORNEY

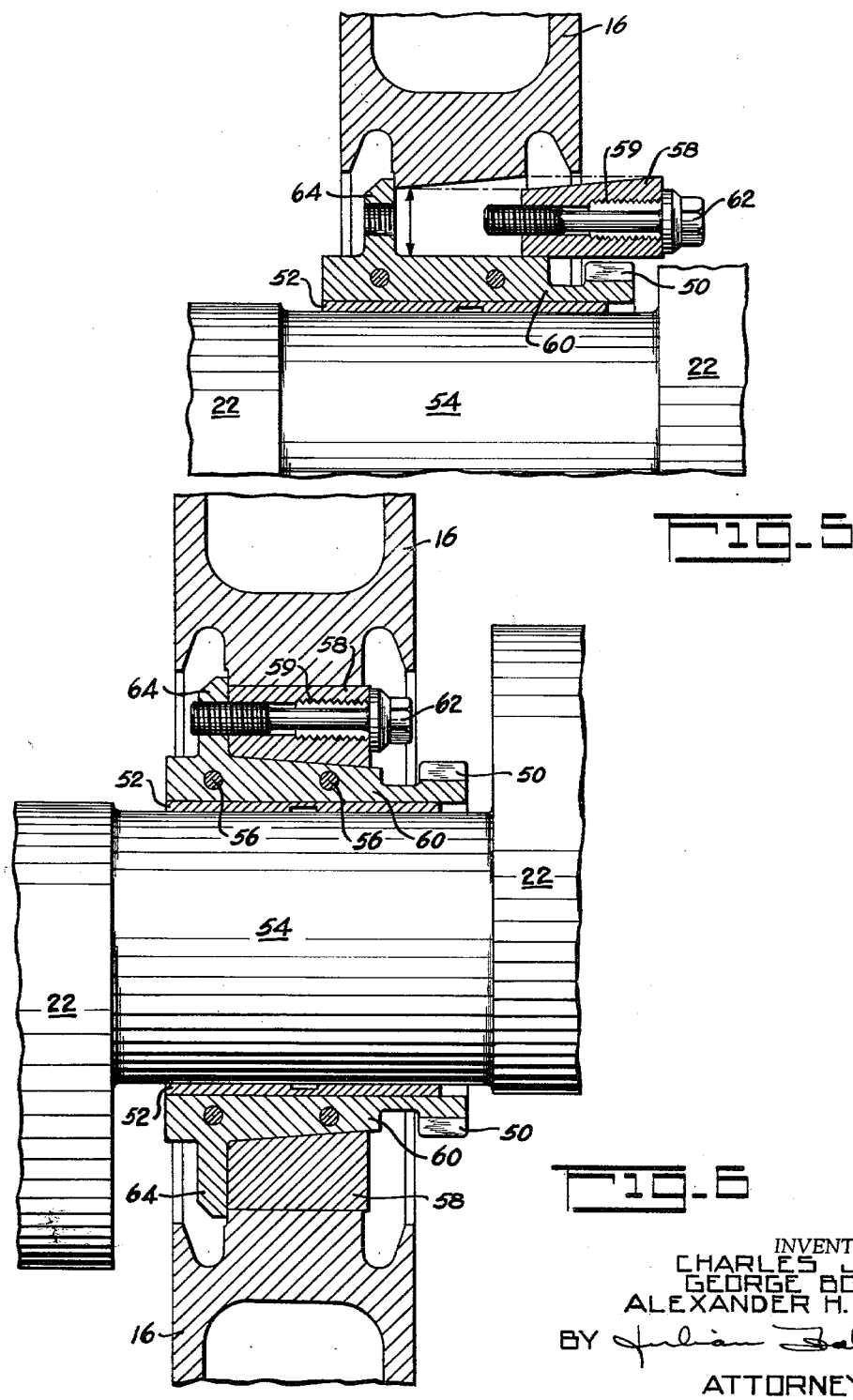

3,193,187
MULTI-UNIT ROTARY MECHANISM
Charles Jones, Paramus, and George Bonner, Oakland, N.J., and Alexander H. Raye, Bellevue, Wash., assignors to Curtiss-Wright Corporation, a corporation of Delaware
Filed Dec. 31, 1962, Ser. No. 248,705
19 Claims. (Cl. 230—145)

This invention relates to rotary mechanisms, such as pumps, fluid motors and internal combustion engines and is particularly directed to a multiple unit rotary mechanism having an integral one-piece shaft. For convenience, the rotary mechanism described herein will take the form of an internal combustion engine, although it is not limited to such, and may be of the type disclosed in United States Patent 2,988,065, issued to Felix Wankel et al.

Rotary combustion engines of the type shown in the aforementioned patent generally comprise an outer body composed of a peripheral wall interconnected with a pair of end walls to form a cavity whose profile preferably is basically an epitrochoid. An inner body or rotor is rotatably supported on a shaft mounted within said outer body which is coaxial with said cavity. The rotor has a plurality of circumferentially-spaced apex portions for sealing engagement with the inner surface of the peripheral wall. The rotor is rotatable relative to the outer body such that the apex portions continuously engage the inner surface of the peripheral wall to form a plurality of working chambers which vary in volume during engine operation. An intake port is provided for admitting air or a fuel-air mixture to said working chambers for combustion therein and an exhaust port is provided for expelling the burnt gases from said chambers. An ignition means may be provided for igniting the fuel-air mixture which may be eliminated when the engine is designed to run on the diesel cycle. During engine operation the sequence of intake, compression, expansion and exhaust is carried out, similar to that which takes place in conventional reciprocating-type internal combustion engines.

The invention generally comprises a multi-unit rotating combustion engine having at least three axially aligned cavities therein with a rotor mounted on the engine shaft in each of the cavities, although the invention is also applicable to two unit engines wherein the shaft at one of the end housings must be made heavier than usual so that gearing normally cannot be mounted at this region. The housing of the multi-unit engine is formed from a plurality of rotor housings each comprising a peripheral wall, an end housing at each axial end of the engine and at least two intermediate housings between two adjacent units of the multi-unit engine. Some prior constructions of engines of this type required a split shaft for assembly reasons which proved to be structurally weak and difficult to assemble. A later construction of a multi-unit rotating combustion engine, such as that shown in United States application No. 853,560 filed on November 17, 1959, now Patent No. 3,062,435 issued November 6, 1962 and assigned to the same assignee as the present application, used a one-piece crankshaft with split gears and bearings. However, for assembly purposes, it was required that the intermediate housings also be split. It is of course preferable from a structural and weight standpoint not to split the intermediate housings, particularly when using an engine housing made of light alloy material and operating at relatively high temperatures. The present invention permits the use of a one-piece crankshaft construction in a multi-unit rotating combustion engine, as well as one-piece intermediate housings through a novel construction for the positioning and supporting of the split gears and bearings on the housings and which construction minimizes thermal distortions of the housings and provides improved distribution of contact stresses between the bearing and housing. Also, because of the construction of the present invention, the multi-unit engine components may be readily assembled into a structurally strong working unit.

Accordingly it is one object of the invention to provide a multi-unit rotary combustion engine having a one-piece engine shaft.

Another object of the invention is the provision in a multi-unit rotary combustion engine of a novel split bearing and gear assembly which may be readily assembled over greater diameter portions of a one-piece engine shaft.

A further object of the invention is to provide a novel construction for rigidly supporting a split bearing and gear assembly between an intermediate housing of one-piece construction and an engine shaft of one-piece construction.

An additional object of the invention is to provide a multi-unit rotary combustion engine comprising a multi-part housing construction with a one-piece engine shaft having a plurality of eccentric portions formed thereon and providing novel means for assembling a split bearing and gear combination of smaller diameter than the eccentric portions over the eccentric portions while providing a one-piece intermediate housing construction between two adjacent units of said multi-unit engine.

Figure 2:
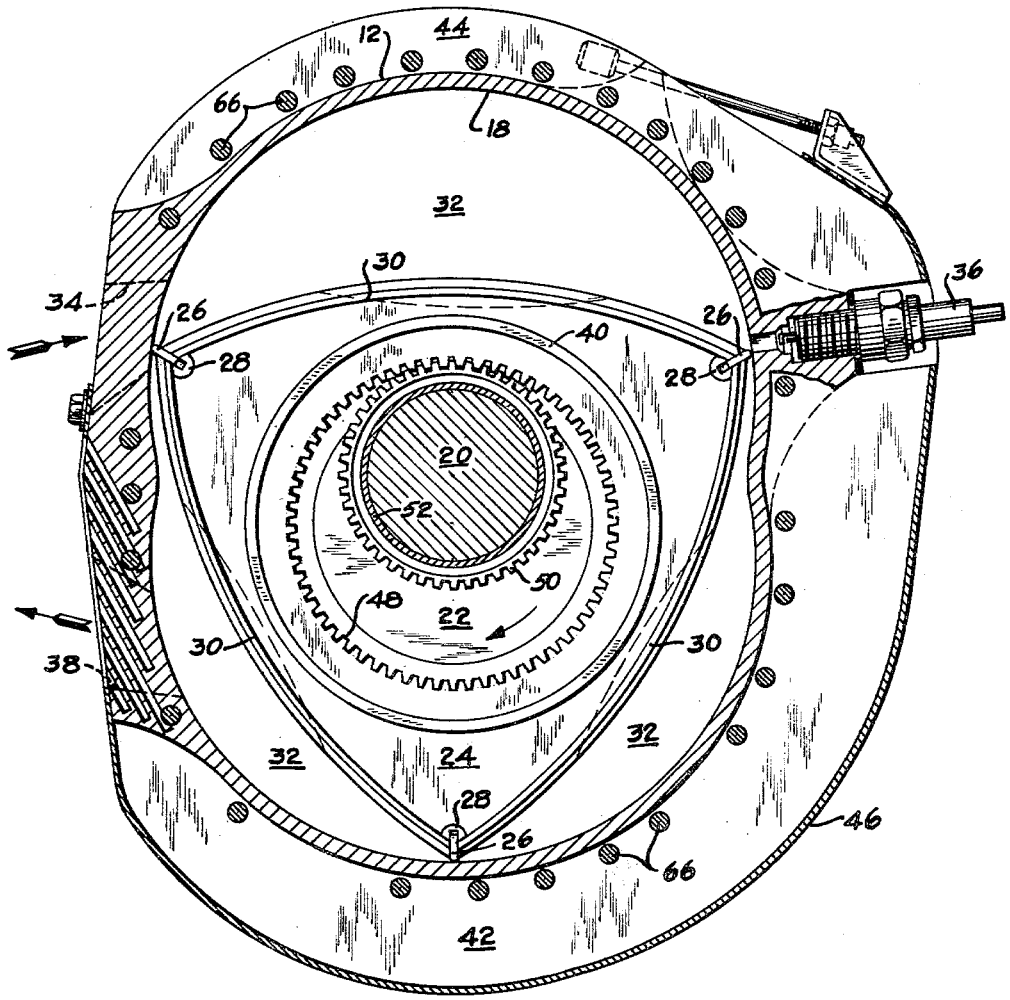
Figure 3:
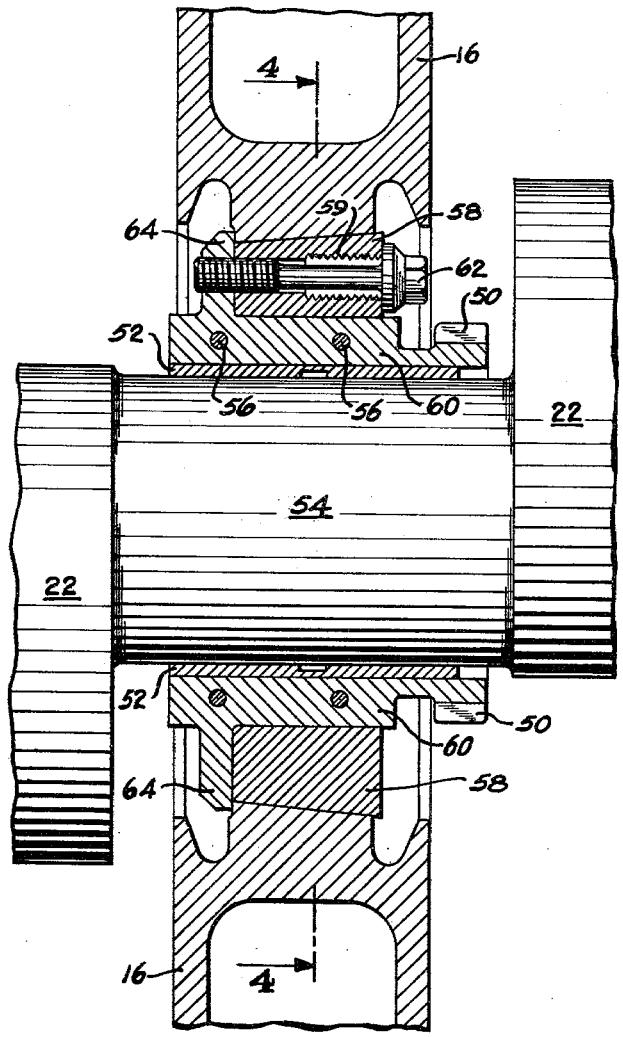
Figure 4:
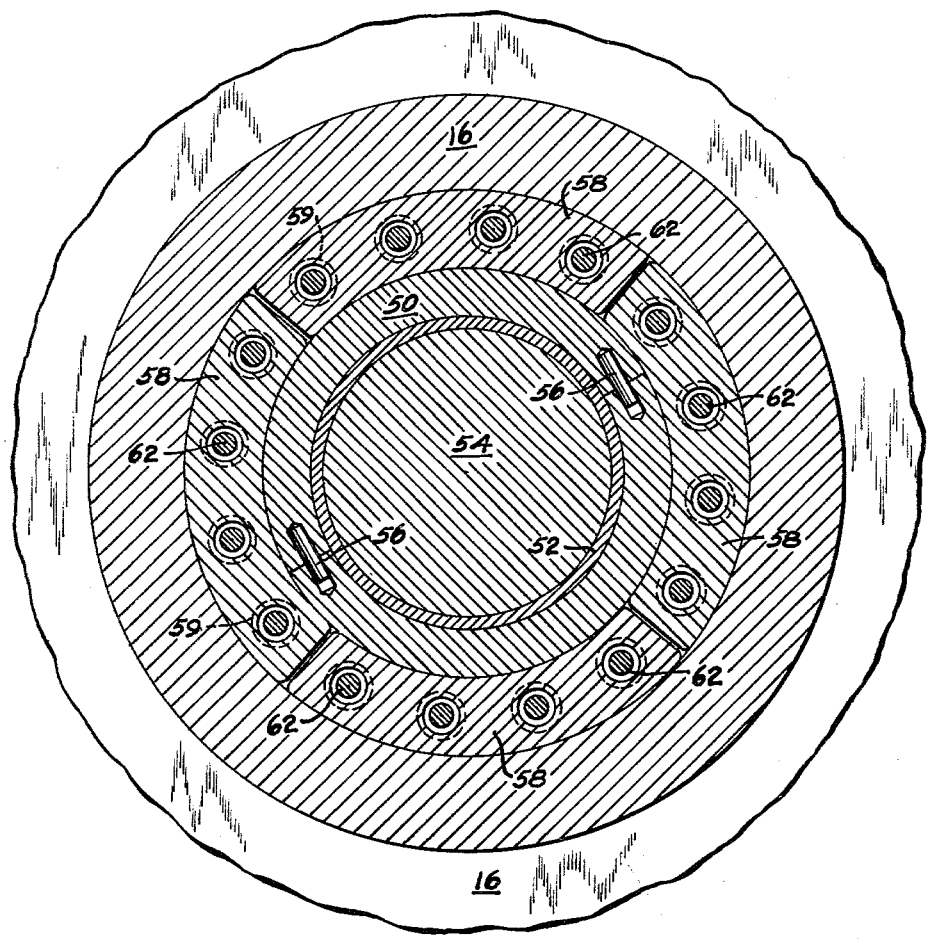

Other objects and advantages of the invention will become apparent upon reading the following detailed description in connection with the drawing in which:

FIG. 1 is a sectional view of a multi-unit rotary combustion engine embodying the present invention, FIG. 2 is a sectional view taken along line 2—2 of FIG. 1, FIG. 3 is an enlarged partial sectional view showing the split bearing and gear supporting means on the one-piece intermediate housing, FIG. 4 is a sectional view taken along line 4—4 of FIG. 3, FIG. 5 is an enlarged sectional view similar to that of FIG. 3 showing the elements of the invention during assembly and, FIG. 6 is another view similar to that of FIG. 3 showing another embodiment of the invention.

Referring to the drawing, there is shown a multi-unit rotary combustion engine, composed of a plurality of rotary combustion units each generally designated at 10, said multi-unit engine being composed of a multi-part housing comprising a plurality of peripheral walls 12 being mounted coaxially with a one-piece rotatable engine shaft 20 which extends through the multi-unit engine. The peripheral walls 12 are axially spaced along the engine shaft 20, there being four such peripheral walls 12 shown in FIG. 1. Interconnected with the peripheral walls 12 at each axial end of the engine are two end housings 14 and between adjacent peripheral walls 12, intermediate housing 16 are interconnected therewith. As can be seen from FIG. 1, the interconnection of the peripheral walls 12, end housings 14 and intermediate housings 16 serves to define four axially-spaced cavities 17. It should be understood, however, that the invention described herein is equally applicable to any multi-unit engine having two or more axially-aligned rotary units and the invention is disclosed as a four unit engine only for purposes of description. As further illustrated in FIG. 2, the inner surface 18 of each peripheral wall 12 has a multi-lobed profile which preferably is basically an epitrochoid.

The shaft 20 extends through the engine and, as stated above, is mounted coaxially with each of the cavities. The shaft 20 has a plurality of eccentric portions 22 formed thereon, there being one such eccentric portion aligned with each one of the cavities. Viewing the multi-unit engine of FIG. 1 from left to right, the first two eccentric portions 22 shown therein are disposed at 180° from each other and at 90° to the latter two eccentric portions which are in turn disposed at 180° to each other. Rotatably mounted on each eccentric portion 22 is a rotor 24, only two of which are shown in FIG. 1 and, as illustrated in FIG. 2, the rotors 24 have a plurality of circumferentially-spaced apex portions each having a radially-movable seal strip 26 mounted therein for sealing engagement with the inner surface 18 of the peripheral wall 12. Intermediate seal bodies 28 are disposed at the ends of the apex portions to provide for sealing cooperation between the apex seals and the side seals 30 in each side face of the rotor and for sealing engagement with the respective inner faces of end housings 14 and intermediate housings 16. Working chambers 32 are formed between the inner surface of the peripheral wall 12 of each cavity and the outer peripheral surface of each rotor between its adjacent apex portions, which working chambers vary in volume as each rotor rotates relative to its respective housing. Each cavity is provided with an intake port 34 for admitting air or a fuel-air mixture to the working chambers 32 for combustion therein, an ignition means 36 may be provided in each cavity for igniting the fuel-air mixture and an exhaust port 38 is also provided in each cavity for expelling the burnt gases from the engine so that during engine operation the phases of intake, compression, expansion and exhaust are carried out in each of the respective units of the engine. The rotor housing cavities are aligned one behind the other on shaft 20 and have their intake ports 34 and exhaust ports 38 respectively aligned one behind the other so that for example, each of the intake ports 34 of each rotary unit 10 is positioned in axial alignment with each of the other intake ports 34 of each of the other rotary units of the engine. An oil seal 40 is provided radially inwardly of the side seals 30 of each rotor in order to prevent any oil from leaking outwardly into the working chambers 32.

As also shown in FIGS. 1 and 2, axially-spaced cooling fins 42 may be provided on each of the peripheral walls 12 in the regions wherein large quantities of heat are generated and along with supporting ribs 44 serve to keep the peripheral wall 12 rigid during engine operation. The fins 42 are enclosed by a baffle plate 46 which extends circumferentially around the engine as shown in FIG. 2. A suitable fan (not shown) may be connected to the engine for supplying cooling air to the engine cooling fins 42. However, it should be understood that the engine may be cooled in any suitable manner and the cooling system forms no part of the present invention. For example, the engine may be liquid cooled.

Each rotor 24 has an internally-toothed gear 48 secured thereto and the gear 48 may have an axially extending shank portion which serves as a bearing support for the rotor on the eccentric 22. However, a separate plain sleeve type bearing may be used to support the rotor on the eccentric and the gear 48 suitably bolted or otherwise secured to the rotor. The gear 48 of each rotor meshes with a fixed externally-toothed gear 50. The fixed gear 50 meshes with the gear 48 of a rotor at one end of the engine (left end as shown in FIG. 1) and is secured to the adjacent end housing 14 as by screws. The remaining three fixed gears 50 for the other three rotors 24 are disposed about the shaft 20 adjacent the shaft eccentric portions 22 and are secured to the adjacent intermediate housings 16 in a manner which will be more fully explained below. Plain sleeve-type bearings 52 are supported in between the gears 50 on journal portions 54 on the shaft 20 to provide a shaft bearing support therebetween, said bearings 52 being supported in a manner which will also be more fully explained below. In a multi-unit engine of the type described having four rotary engine units, two of the fixed gears 50 may be secured to the two end housings 14 and therefore at least two externally-toothed gears 50 must normally be mounted on intermediate housings 16. As illustrated, however, three of the gears 50 are secured to intermediate housings 16, as shown in FIG. 1.

The available power output of the multi-unit engine is substantially equal to power available from one of the units multiplied by the number of units connected to the shaft 20. As stated above, it is desirable in a multi-unit engine of the type described herein, to provide a one-piece engine shaft for structural and assembly reasons. In order to permit the one-piece shaft to be removed from the multi-unit engine, the inner diameter of the intermediate housings 16 must be large enough for the eccentric portions 22 to pass through said housings but must also be kept at a minimum to provide maximum overlap between the rotor 24 and the end walls of the intermediate housings 16.

For assembly of the fixed gears 50 and bearings 52 at the shaft journal portions 54 adjacent the intermediate housings or in other words, between the end eccentric portions, the gears 50 and bearings 52 must be split since their inner diameter is less than the outer diameter of the eccentric portions 22, as is apparent from FIG. 1. In a prior embodiment of a multi-unit engine using a one-piece shaft, each intermediate housing was split in a plane transverse to their housing axis, so that the split fixed gears and bearings could be bolted to an adjacent half of an intermediate housing without significantly reducing the overlap between the rotor 24 and the end walls of the intermediate housing which engaged the respective side faces of the rotor. Reference may be made to copending application Serial No. 853,560, filed November 17, 1959, now Patent No. 3,062,435, issued November 6, 1962, for a more complete description of a multi-unit engine of the type described above.

It is desirable in multi-unit engines having housings made of light alloy material, such as aluminum, and in particular where such engines are air cooled, that the intermediate housings be of one-piece construction. In such light alloy housings, engine weight, structural strength and thermal distortions are important considerations to be taken into account. By using a one-piece construction for the intermediate housing, a structurally strong light alloy housing may be used which is relatively light in weight and which due to the construction of the present invention minimizes the problem of distortions which may be present due to the relatively high temperature operation of these engines.

As in the case of the prior construction discussed above, the fixed gears 50 and bearings 52 are also split into semi-cylindrical halves and the gears and bearings are journaled on the journal portions 54 of shaft 20 so that their split ends are disposed in regions of minimum loads. In the present invention as illustrated, the gear halves may be aligned by means of pins 56 (FIG. 4), although the pins 56 may be entirely eliminated, and along with the split halves of bearing 52 and are held firmly together by means of a surrounding split cone or wedge-shaped ring member 58 in a manner which will be discussed more fully below.

In accordance with the invention, so that a one-piece intermediate housing may be used having an inner diameter slightly larger than the outer diameter of the eccentric 22 without significantly reducing the overlap between the end wall of the intermediate housings and the rotor, a split cone or wedge-shaped ring member 58, hereinafter referred to as ring member 58, is utilized for positioning and supporting the split fixed gear 50 and split bearing 52 on the intermediate housing 16 at the journal portions 54 of shaft 20. As viewed in FIGS. 1, 3 and 4 the ring member 58 is also split into a plurality of ring sectors for assembly purposes and has an external surface which is tapered giving it the configuration of a section of a cone. As illustrated in FIG. 4, the ring member 58 is split into four sectors, but it should be understood that the ring member may be split into other members of sectors numbering two or more. With reference to FIG. 5 in particular, which shows the ring member 58 being assembled, it can be seen that the outer surface of ring member 58 is tapered and in the region of its minimum diameter the thickness of the ring member 58 is greater than the minimum distance from the inner surface of intermediate housing 16 to the outer surface of the axially extending shank portion 60 of fixed gear 50 so that when the ring member is inserted between the intermediate housing and the fixed gear the ring member will have a wedging effect and provide a tight interference fit. The inner surface of intermediate housing 16 which mates with the tapered outer surface of the ring member 58 (FIG. 3) is also tapered at the same angle as the outer surface of ring member 58 to provide tight fitting mating surfaces between the ring member 58 and the intermediate housings 16. The inner surface of the ring member 58 and the mating outer surface of fixed gear 50 are also identical, both of these surfaces being concentric with the journal portion 54 of shaft 20.

As further shown in FIGS. 1, 3, 4 and 5 the sectors of the ring member 58 have a plurality of holes therein through which screws 62 may pass into a tapped hole in radially extending gear flange 64 in order to fasten the ring member 58 to the radially extending flange portion 64 on fixed gear 50. The flange portion 64 extends radially outwardly, as viewed in said figures, slightly beyond the radially inward extent of the intermediate housing 16 so that the flange portion 64 abuts against one side of the intermediate housing. Therefore, when the screws 64 are inserted into the flange portion 64 the gear is prevented from moving axially and the ring member may be pulled tightly into position. As stated above, the ring member 58 has a minimum outer diameter which is slightly greater than the minimum distance between the inner surface of the intermediate housing 16 and the outer surface of fixed gear 50. Therefore, when the ring member 58 is inserted between the intermediate housing and the fixed gear and the screws 62 tightened, the ring member 58 will be wedged between the intermediate housing and fixed gear, as it is drawn in an axially inward direction.

As shown in FIG. 4, the junction of the sectors of the split ring member 58, or its split liners, are not aligned with the split lines of split fixed gear 50 and split bearing 52 in order to avoid the possibility of any structural weakness which might occur, if the split lines were aligned.

Because of the construction of the present invention, a tight interference fit is provided between the intermediate housing 16, the ring member 58 and the fixed gear 50. As the ring member 58 is forced axially by tightening of the bolts 62, the ring member tightly clamps the fixed gear halves and bearing halves so that during engine operation the halves of the fixed gear and bearing are held tightly in place and any rotational movement of these elements is prevented by the clamping action of the wedge-shaped ring member 58. The clamping action of the wedge-shaped ring member 58 joins the two halves of the gear at their split surfaces under a very high force, which is distributed across the entire surfaces of the mating split surfaces and holds the gear halves tightly together. Thus, the use of bolts for holding the gear halves together, which was required in prior constructions, has been found to be unnecessary. The mating surfaces between the ring member 58, the intermediate housing 16 and the fixed gear 50 provide for a relatively large bearing area, which is equal to substantially the entire axial length of the ring member 58 so that the contact stresses between these elements will be relatively low.

High output engines of the type described herein normally operate at relatively high temperature levels. Also, because of the fact that the housings may be made of light alloy materials, for example aluminum, the housings will be subject to thermal expansion which may result in a loss of radial contact at the bearing support between the light alloy intermediate housing and the fixed gear, which is normally formed from a material having relatively low thermal expansion characteristics such as steel, and may also result in an increase in the journal bearing clearance between the shaft 20 and bearing 52 at the journal portions 54. However, due to the tight wedging effect of the ring member 58 the mating components, intermediate housing 16, ring member 58 and fixed gear 50, tend to act like a composite structure of the three individual components which composite structure has been found to have a lower degree of thermal expansion than that of the light alloy housing at its bearing support region. Because the composite structure tends to have thermal expansion characteristics substantially less than that of the individual light alloy housing components it has been found that the diametrical thermal growth at the bore of the journal bearing support will be substantially minimized.

FIG. 6 illustrates another embodiment of the invention. In the embodiment of FIG. 6 the inner surface of the split wedge-shape ring member 58 is tapered instead of the outer surface, as described in the embodiment above. The outer surface of the split ring member 58 and the inner surface of intermediate housing 16 are concentric with journal portion 54, as in the case of the inner surface of the ring member 58 and outer surface of gear 50 as described above. The outer surface of split fixed gear 50 in this embodiment is tapered to mate with the tapered inner surface of split ring member 58. Thus, the wedging action in this embodiment occurs between the inner surface of the split ring member 58 and the outer surface of fixed gear 50. The assembly and operation of the invention illustrated in FIG. 5 is essentially the same as that in the embodiment described above.

The multi-unit engine of FIG. 1 may be assembled in the following manner. As viewed from the left side of FIG. 1, an end housing 14, an externally-toothed gear 50 and plain sleeve type bearing 52 are journaled on journal portion 54 of shaft 20 with the gear 50 being suitably bolted to the end housing 14. A rotor 24 and internally-toothed gear 48 are then journaled onto an eccentric portion 22 with the gear 48 and 50 in meshing engagement. A peripheral wall 12 is then placed in abutting engagement with the end housing 14, as illustrated. One half of a bearing 52, fixed gear 50 and the splot cone-like ring member 58 are each individually slid over the eccentrics 22 and positioned between the shaft journal portion 54 and inner surfaces of intermediate housing 16. The shaft 20 is then rotated so that the other half of the bearing, gear and ring member may also be slid over the eccentric portion into their respective position on shaft journal portion 54. An intermediate housing 16 may then be slid over the eccentric portions 22 from the right side of the engine, as viewed in FIG. 1 and placed in abutting engagement with peripheral wall 12 and rotor 24. The screws 62 are then inserted through the ring member 58 and the ring member loosely wedged into position. The screws may then be threaded into the holes in gear flange 64, which are tapped to receive the threads on screws 62, and the screws are then uniformly tightened down to clamp the bearing and gear halves together and to tightly wedge the gears and bearing between the intermediate housing 16 and shaft journal portion 54. Threads 59 may be provided so that a tool may be inserted to remove the ring member 58 when the engine is disassembled.

The remainder of the parts of the multi-unit engine of FIG. 1 are assembled similarly to that described above and finally an end housing 14 is placed on the opposite axial end of the multi-unit engine and suitable bolts 66 may be inserted through the axial length of the engine, as illustrated, to tightly hold the units together. Of course, individual bolts could be used between adjacent units instead of the single bolts shown in FIG. 1.

So it can be seen that, due to the structure of the present invention, a one-piece engine shaft and one-piece intermediate housing may be provided in a multi-unit rotary combustion engine wherein the journal bearings and fixed gear supported on journal portions of the engine shaft may be readily assembled in the multi-unit engine. The structure of the invention further provides for preventing the fixed gear and bearings from rotating from their fixed positions and provides for substantially uniform journal bearing clearance and bearing support at the inner surface of the intermediate housings and minimizes any diametrical thermal growth at the bore of the journal bearing support. It should be understood, however, that, although the multi-unit engine described herein has four axially aligned units, the invention is applicable to multi-unit engines having any number of units for example, a two or three unit engine.

While the invention has been set forth in specific detail in the above description it is not intended that it be so limited and it will be apparent to those skilled in the art that various changes and modifications may be made without departing from the spirit and scope of the invention as defined in the following claims.

We claim:

1. A multi-unit rotary mechanism comprising at least three axially aligned rotary units having a common rotatable one-piece shaft, each said rotary unit having a peripheral wall mounted coaxially with said one piece shaft and the inner surface of said peripheral wall having a multi-lobed profile, an intermediate housing interconnected with the peripheral walls of adjacent rotary units and an end housing interconnected with the peripheral walls of two of said rotary units and positioned at each axial end of said rotary mechanism thereby defining a multi-lobed cavity in each of said rotary units with said one piece shaft passing through each of said intermediate housings and said end housings, said one-piece shaft having a plurality of axially-spaced eccentric portions formed thereon there being one eccentric portion for each of said cavities, said intermediate housing having an opening therein with a relatively larger diameter than each said eccentric portion, a rotor rotatably supported on each of said eccentric portions and having a plurality of circumferentially-spaced apex portions for sealing engagement with the inner surface of said peripheral wall and each rotor carrying an internal gear thereon, a plurality of fixed gears disposed about said one-piece shaft, one for and in meshing engagement with each of said internal gears, said fixed gears having an inner diameter less than the outer diameter of said eccentric portions, and each fixed gear disposed between the end eccentric portions being split for assembly about said one-piece shaft, wedge means inserted between and in tight contacting engagement with the inner surface of each of said intermediate housings and the outer surface of each of said split fixed gears for supporting said split fixed gears on said intermediate housings and for maintaining said split fixed gears in fixed positions on their respective housings.

2. A multi-unit rotary mechanism as recited in claim 1 wherein said wedge means comprises a split ring member having a tapered outer surface and the minimum thickness of said split ring member being greater than the minimum distance between the inner surface of said intermediate housing and the outer surface of said split fixed gears to provide a tight fit therebetween.

3. A multi-unit rotary mechanism as recited in claim 2 wherein said split ring member is split into at least two ring sections for assembly about said one-piece shaft.

4. A multi-unit rotary mechanism as recited in claim 2 wherein the inner periphery of said intermediate housing is tapered to receive said split ring member.

5. A multi-unit rotary mechanism as recited in claim 1 wherein said wedge means comprises a split ring member having a tapered inner surface and the minimum diameter of said split ring member being greater than the minimum distance between the inner surface of said intermediate housing and the outer surface of said split fixed gear to provide a tight fit therebetween.

6. A multi-unit rotary mechanism as recited in claim 5 wherein a portion of the outer surface of said split fixed gear is tapered to receive said ring member.

7. A multi-unit rotary mechanism as recited in claim 1 wherein each said split fixed gear is split into two semi-cylindrical halves for assembly about said one-piece shaft.

8. A multi-unit rotary mechanism as recited in claim 7 including a plurality of annular bearing sleeves disposed around said one-piece shaft between said one-piece shaft and each of said split fixed gears, said bearing sleeves also being split into two semi-cylindrical halves for assembly about said one-piece shaft.

9. A multi-unit rotary mechanism as recited in claim 1 wherein each of said intermediate housings is made of one-piece construction and wherein the diameter of the inner periphery of said one-piece intermediate housings is greater than the outer diameter of said eccentric portions for assembly of said one-piece intermediate housings over said eccentric portions.

10. A multi-unit rotary mechanism as recited in claim 1 wherein said wedge means comprises a split ring member having at least one surface with a cone-like configuration with its minimum diameter being greater than the minimum distance between the inner surface of said intermediate housing and the outer surface of said split-fixed gear such that when said split ring member is inserted between the inner surface of said one-piece intermediate housing and the outer surface of said split fixed gear said split ring member tightly wedges said split fixed gear between said one-piece intermediate housing and said one-piece shaft.

11. A multi-unit rotary mechanism as recited in claim 10 wherein the outer surface of said split ring member is tightly wedged against substantially the entire inner surface of said one-piece intermediate housing.

12. A multi-unit rotary mechanism as recited in claim 10 wherein means are provided for securely fastening said split ring member to said split fixed gears.

13. A multi-unit rotary mechanism as recited in claim 1 wherein said intermediate housing interconnected with the peripheral walls of the adjacent rotary units is made of one-piece construction and each one-piece intermediate housing having a split fixed gear supported thereon.

14. A multi-unit rotary mechanism as recited in claim 1 wherein said wedge means comprises a split ring member, said split ring member being split into at least two ring sectors.

15. A multi-unit rotary mechanism comprising a plurality of axially aligned rotary units with each of said units having a peripheral wall the inner surface of which has a multi-lobed profile, an end housing interconnected with said peripheral walls at each axial end of said rotary mechanism and an intermediate housing interconnected with the peripheral walls of adjacent rotary units, a one-piece shaft extending coaxially through said rotary mechanism and having a plurality of eccentric portions formed thereon, there being one eccentric portion aligned in each of said rotary units, a rotor rotatably supported on each of said eccentric portions and having a plurality of circumferentially-spaced apex portions for sealing engagement with the inner surface of said peripheral wall and each rotor carrying an internal gear thereon, a plurality of fixed gears disposed about said one-piece shaft and having an inner diameter less than the outer diameter of said eccentric portions, each of said fixed gears being in meshing engagement with an internal gear, at least one of said fixed gears being disposed between two eccentric portions and being split for assembly about said one-piece shaft and wedge means for supporting said split fixed gear on an intermediate housing, said wedge means being disposed between the outer surface of said split fixed gear and the inner surface of said intermediate housing.

16. A multi-unit rotary mechanism as recited in claim 15 comprising at least two axially aligned rotary units interconnected with an intermediate housing and said wedge means comprising a split ring member being split into at least two ring sectors for assembly about said one-piece shaft.

17. A multi-unit rotary mechanism as recited in claim 16 wherein said split ring member has a minimum diameter greater than the minimum distance between the inner surface of said intermediate housing and the outer surface of said split fixed gear.

18. A multi-unit rotary mechanism as recited in claim 17 wherein the inner surface of said intermediate housing is tapered and the outer surface of said split ring member is tapered for mating engagement with said tapered inner surface of said intermediate housing.

19. A multi-unit rotary mechanism as recited in claim 17 wherein the outer surface of said split fixed gear is tapered and the inner surface of said split ring member is tapered for mating engagement with said tapered outer surface of said split fixed gear.

References Cited by the Examiner

UNITED STATES PATENTS

| 3,013,542 | 12/61 | Freyn | 123—195 |
| 3,062,435 | 11/62 | Bentele | 123—8 |
| 3,123,058 | 3/64 | Wooge | 123—195 |

FOREIGN PATENTS

| 21,999 | 9/61 | Germany. |
| 82,182 | 12/34 | Sweden. |

JOSEPH H. BRANSON, Jr., *Primary Examiner.*

WILBUR J. GOODLIN, *Examiner.*